United States Patent
Golightly

(10) Patent No.: US 7,636,555 B2
(45) Date of Patent: Dec. 22, 2009

(54) EVENT LIST SPECIFICATION BASED RADIO INTERFACE CONTROL

(75) Inventor: Derek Golightly, Steyning (GB)

(73) Assignee: GLOBALFOUNDRIES Inc., Grand Cayman (KY)

( * ) Notice: Subject to any disclaimer, the term of this patent is extended or adjusted under 35 U.S.C. 154(b) by 588 days.

(21) Appl. No.: 11/106,774

(22) Filed: Apr. 15, 2005

(65) Prior Publication Data

US 2006/0116163 A1 Jun. 1, 2006

(30) Foreign Application Priority Data

Nov. 30, 2004 (DE) .................. 10 2004 057 766

(51) Int. Cl.
*H04M 3/00* (2006.01)
(52) U.S. Cl. .................. 455/73; 455/418; 455/566
(58) Field of Classification Search ......... 455/557–558, 455/418–420, 343.1–343.5, 556.1–556.2, 455/66.1, 412.1, 566
See application file for complete search history.

(56) References Cited

U.S. PATENT DOCUMENTS

| | | | |
|---|---|---|---|
| 5,475,877 A * | 12/1995 | Adachi | 455/343.2 |
| 5,524,008 A | 6/1996 | Levy | |
| 6,628,965 B1 * | 9/2003 | LaRosa et al. | 455/557 |
| 6,954,470 B2 | 10/2005 | Paneth | |
| 7,174,190 B2 * | 2/2007 | Walker et al. | 455/557 |
| 7,248,848 B2 | 7/2007 | Matthews et al. | |
| 2002/0143845 A1 | 10/2002 | Kardach | |
| 2003/0153368 A1 * | 8/2003 | Bussan et al. | 455/574 |
| 2003/0204429 A1 * | 10/2003 | Botscheck et al. | 705/8 |
| 2004/0107179 A1 * | 6/2004 | Dalrymple et al. | 707/1 |
| 2005/0020316 A1 * | 1/2005 | Mahini | 455/566 |
| 2005/0101283 A1 * | 5/2005 | Kimata | 455/336 |
| 2005/0257236 A1 * | 11/2005 | Ando | 725/37 |
| 2007/0004375 A1 * | 1/2007 | Lindlar et al. | 455/343.1 |
| 2007/0173242 A1 * | 7/2007 | Lau et al. | 455/419 |

FOREIGN PATENT DOCUMENTS

EP 0994614 3/2005

OTHER PUBLICATIONS

Translation of Office Action in German Application No. 10 2004 057 766.8-31 issued Jul. 19, 2006.

* cited by examiner

*Primary Examiner*—Simon D Nguyen
(74) *Attorney, Agent, or Firm*—Meyertons, Hood, Kivlin, Kowert & Goetzel, P.C.

(57) ABSTRACT

A radio communications technique is provided where the operation of a radio interface is controlled based on an event list. The event list specifies a sequence of events which each specify a control task to be performed when controlling operation of the radio interface. The event list may be configured based on event list specification data received.

66 Claims, 5 Drawing Sheets

EVENT LIST SPECIFICATION BASED RADIO INTERFACE CONTROL

BACKGROUND OF THE INVENTION

1. Field of the Invention

The invention generally relates to radio communications devices and methods, and more particularly to techniques of controlling the radio interface in such devices.

2. Description of the Related Art

Radio communications devices are widely used in voice and/or data communication networks. Examples of such networks are WWAN (Wireless Wide Area Network) networks which utilize digital mobile phone systems to access data and information from any location in a specific range. Using a mobile phone or the like as a modem, a mobile communication device such as a notebook computer, an PDA (Personal Digital Assistant), or a device with a standalone radio card can receive and send information from a network, a corporate intranet, or the Internet.

Other examples of radio communications networks are GPRS (General Packet Radio Service) networks which use a 2.5G technology implemented in GSM (Global Systems for Mobile Communications) networks. GPRS is a packet based "always on" technology with data transfer speeds of up to a theoretical maximum of about 171.2 kbps. EGPRS (Enhanced GPRS) uses the 8PSK (Phase Shift Keying) modulation technique to further increase the achievable user data rate. Other radio communications networks exist as well.

Transceiver (i.e. transmitter/receiver) devices or just receiver devices in such radio communications devices generally have a radio module which is attached to an antenna to receive the radio signals which have the voice or other data modulated. Alternatively, transceiver devices may be part of a radio module which is attached to the antenna. Further, the devices usually have some processing hardware to demodulate the received signals and process the demodulated data in a suitable manner.

Moreover, the receiver gain values and the path the data takes through the receiver circuit is controlled. In addition, the following tasks are triggered: (a) the software control tasks, and (b) the DSP tasks that analyse/handle the received data. There may also be a transmission function that: (a) selects the type of modulation for the data transmission, (b) controls the transmission burst power level levels and power level transition profiles, and (c) sets radio circuit calibration parameters in real time. All of these controls have to be done within tight real time constraints. These constraints are met by a combination of hardware and software functions.

To allow the processing unit to correctly interface to the radio module, it usually has a radio interface unit that can be controlled to perform actions like turning on or off the radio circuit or the like. Thus, the processing units usually include a control mechanism to control the radio interface to achieve suitable operation. The manner of how the radio interface is controlled is usually hard coded or, if software based, stored in a non-volatile memory to allow proper operation even if the device was powered down for a certain time.

However, the conventional techniques have been found to be detrimental as there is a severe lack of flexibility. For instance, if a radio module of a device is to be replaced with a radio module of a (even slightly) different kind, it would be necessary for the processing unit to change the manner of how to control the radio interface since the timing of individual control tasks or even the sequence of tasks may change. Thus, it is often not possible in conventional devices to exchange a radio module by another module without also exchanging the processing units or parts thereof.

Another situation where the lack of flexibility is found to be detrimental is the development of circuit designs for upcoming radio module techniques. In such situations it may happen that there are not yet suitable radio modules available so that the development of processing units is stalled. This is disadvantageous as it might slow down the development and implementation of new techniques.

SUMMARY OF THE INVENTION

An improved radio communications technique is provided which provides greater flexibility in controlling the radio interfaces of radio communications devices.

In one embodiment, a radio communications device comprises a processing unit which is adapted to perform voice and/or data processing, and a radio unit which is connected to the processing unit to provide received voice and/or data signals to the processing unit. The processing unit comprises a radio interface unit which is adapted to interface to the radio unit, and a control unit which is adapted to control operation of the radio interface unit. The control unit is adapted to control operation of the radio interface unit based on an event list which specifies a sequence of events which each specify a control task to be performed when controlling operation of the radio interface unit. The control unit is adapted to configure the event list based on event list specification data.

In another embodiment, a radio communications method is provided which comprises receiving voice and/or data signals and performing voice and/or data processing. The processing comprises controlling operation of a radio interface. The operation of the interface is controlled based on an event list which specifies a sequence of events which each specify a control task to be performed when controlling operation of the radio interface. The event list is configurable based on event list specification data.

According to a further embodiment, a radio communications method comprises receiving event list specification data from a remote data store, analyzing the received event list specification data, generating an event list from the analyzed event list specification data where the event list specifies a sequence of events each specifying a control task to be performed when controlling operation of a radio interface, storing the generated event list, and controlling operation of the radio interface by executing events in the stored event list.

A further embodiment provides a computer-readable storage medium which stores instructions that, when executed on a processor of a computer, cause the processor to generate an event list specification data structure which is arranged for being transmitted to a radio communications device that is capable of generating an event list therefrom and controlling operation of a radio interface by executing events in the generated event list. The event list specifies a sequence of events which each specify a control task to be performed when controlling operation of the radio interface.

In yet another embodiment, there is provided a computer-readable storage medium which stores an event list specification data structure allowing a radio communications device to generate an event list therefrom and control operation of a radio interface by executing events in the generated event list. The event list specifies a sequence of events which each specify a control task to be performed when controlling operation of the radio interface.

In still a further embodiment, a computer-readable storage medium stores instructions that, when executed on a processor of a radio communications device, cause the processor to obtain an event list specification data structure and generate an event list therefrom for controlling operation of a radio interface by executing events in the generated event list. The event list specifies a sequence of events which each specify a control task to be performed when controlling operation of the radio interface.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

As will be apparent from the more detailed description of the embodiments below, a technique is provided for configuring the radio driver interface of a radio communications device for use with a wide variety of radio front end devices. The technique may be particularly useful for baseband devices in GPRS or EGPRS networks. As may be seen from the following description, a technique for software configuration of radio control sequences from a remote data store allows for greater flexibility in the product's configuration. In the embodiments, the configuration may even re-order the sequence of events needed to control the radio.

Figure 1:
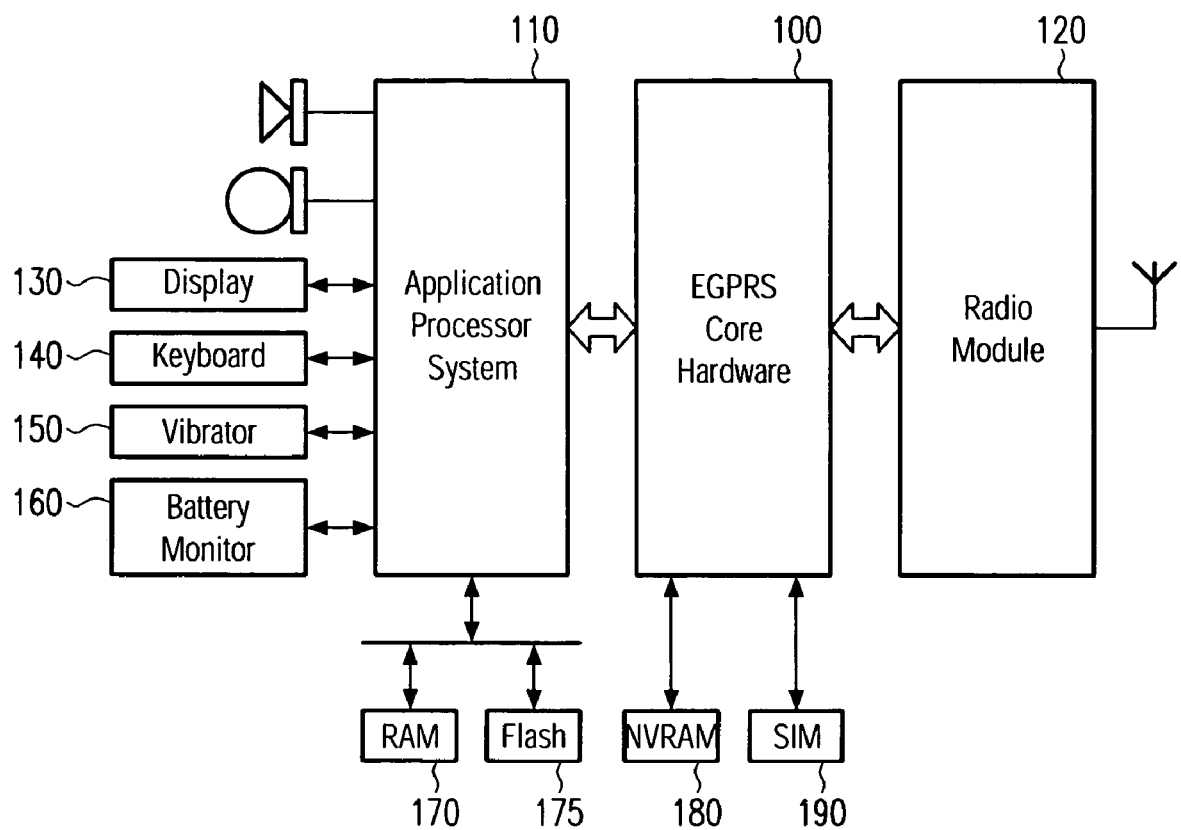
FIG. 1 is a block diagram illustrating the components of a radio communications device according to an embodiment.

Referring first to FIG. 1, the general arrangement of a radio communications device is illustrated. There is provided an EGPRS core hardware 100 which provides voice and/or data processing services. Connected to this processing unit, a radio module 120 is connected to an antenna for receiving radio signals and providing the received voice and/or data signals to unit 100. Further, the device of FIG. 1 has an application processor system 110 which may run phone specific applications and user applications and which may further perform audio system functions. The application processor may also run the upper part of the communications stack.

The application processing system 110 may be coupled to a microphone, a speaker, a display 130, a keyboard 140, a vibrator 150, and a battery monitor 160. Further, the application processor system 110 may be coupled, via a bus system, to a RAM (Random Access Memory) 170 as well as a flash memory 175. Similarly, the EGPRS core hardware processing unit 110 may be coupled to an NVRAM (Non-Volatile RAM) 180 such as an EEPROM (Electrically Erasable Programmable Read-Only Memory), and to a SIM (Subscriber Identity Module) card or card connector 190.

Figure 2:
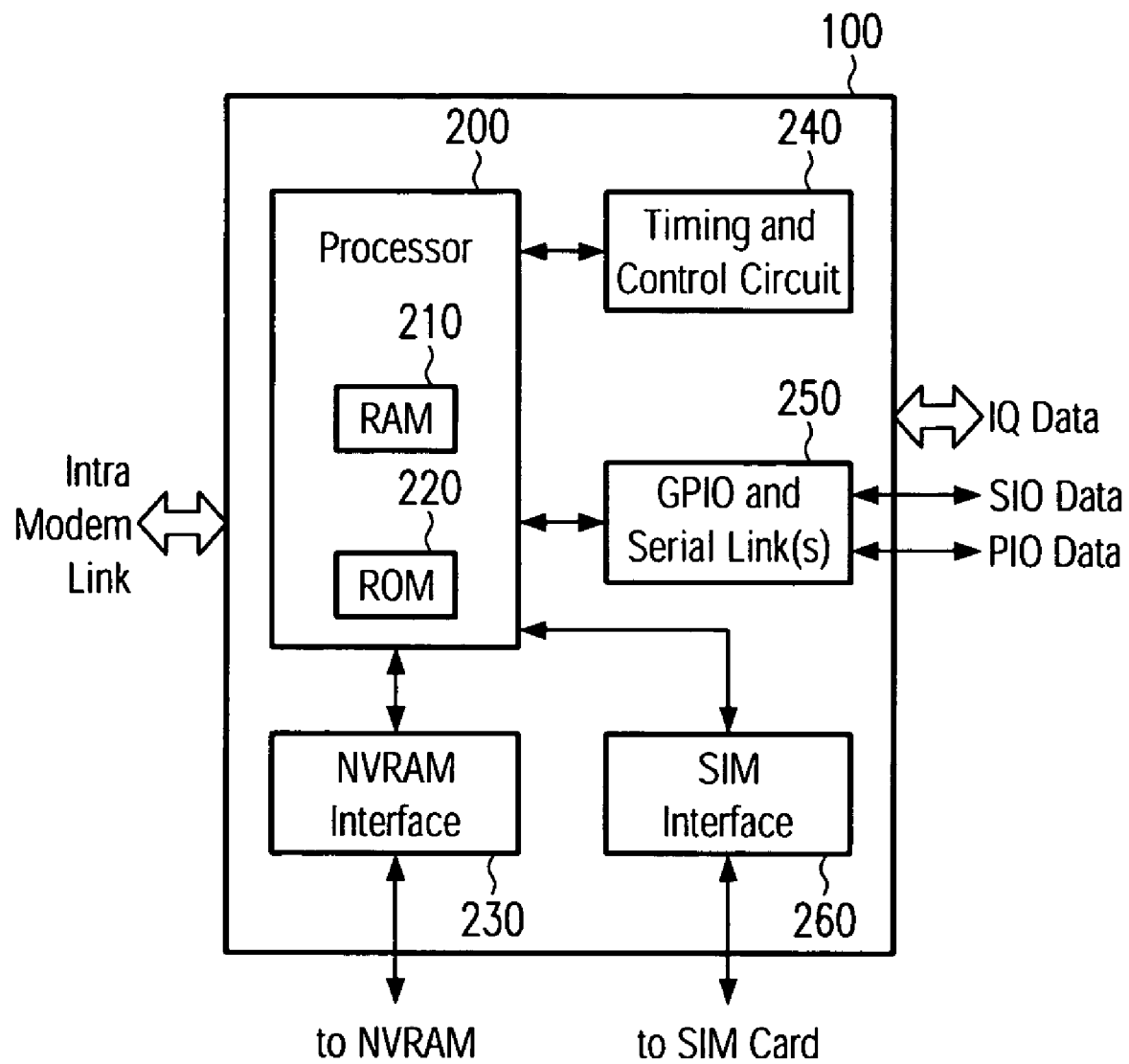
FIG. 2 is a block diagram illustrating the components of the processing unit, or EGPRS core hardware, which is part of the arrangement of FIG. 1, according to an embodiment.

The components of the EGPRS core hardware processing unit 100 of FIG. 1 are shown in more detail in FIG. 2. As may be seen from FIG. 2, the processing unit 100 of the present embodiment has a processor 200 as its central part for performing DSP (Digital Signal Processor) and voice functions and performing lower communications stack tasks. The processor 200 may have an internal RAM 210 and an internal ROM 220. Further, the processor 200 may be coupled to an NVRAM interface 230 for interfacing to the NVRAM module 180, and to an SIM interface 260 for interfacing to the SIM card or card connector 190.

Further, the processing unit 100 has a timing and control circuit 240 coupled to the processor 200 for performing timing and control tasks. As may be seen from the description below, the timing and control tasks may include tasks to control operation of the radio interface.

The radio interface may be built from GPIO (General Purpose Input/Output) and serial links 250 and other units not shown in FIG. 2. The radio interface of the present embodiment may include one or more of the following: a baseband data interface, an SIO (Serial Input/Output) interface, and a PIO (Parallel Input/Output) interface. The baseband data interface of the present embodiment supports configurable communication (of data and any embedded control information) of the transmit bits for modulation (in the uplink direction) and the I/Q data (in the downlink direction) with the mixed signal device.

The SIO interface of the present embodiment supports highly configurable serial communication of control information for the mixed signal device and/or the synthesizer.

The PIO interface of the present embodiment may provide signals to control intra-modem link interface selection, SIM, mixed signal device, synthesizer device, and other functions specific to NVRAM programming.

In another embodiment, there may also be a direct link from the timing and control circuit block 240 to the GPIO and Serial Link(s) block 250.

Figure 3:
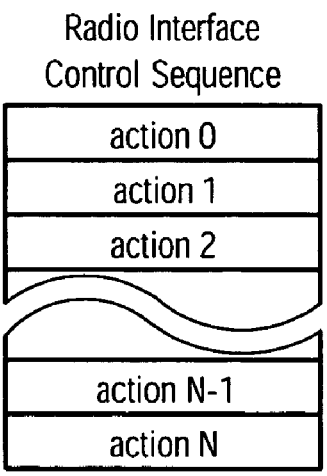
FIG. 3 illustrates a radio interface control sequence according to an embodiment.

Referring now to FIG. 3, the radio interface control according to the embodiments may be considered to consist of a sequence of high level actions. FIG. 3 depicts such a radio interface control sequence consisting of N actions. Examples of high level actions are an action to turn on the radio module 120, an action to turn off the radio module 120, and an action to capture samples for a monitor slot. There may be a great number of other actions.

Figure 4:
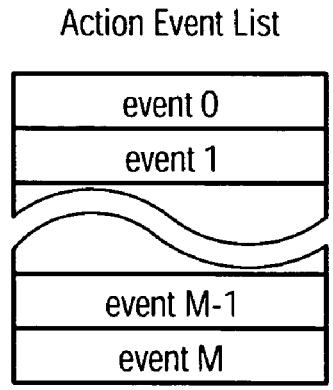
FIG. 4 illustrates an action event list according to an embodiment.

Each of these actions have an associated event list. An example of an action event list is shown in FIG. 4. In the depicted example, the event list has M events, and it is noted that the number M of events in the event list may differ from action to action.

The events in the event list may be pre-ordered but the order of the events may be changed using the software configuration mechanism described below.

In the embodiments, the events either switch a control signal or start an analysis routine in the physical layer platform. Examples of switching a control signal are control tasks to turn on an oscillator or control tasks to enable I/Q sample data to be transferred from the radio module 120 to the EGPRS core hardware 100. It could further be that a serial control word is sent to the radio front end to set some register contents to a new value. An example of analysis routines are routines to analyze sniff data to determine the received signal strength, and hence allow the input amplifier gain to be set so as to optimize the reception of data from the air interface.

To give another example, the action event list of FIG. 4 may consist of a series of entries that instruct the timing and control circuit 240 to either change the state of one of the general purpose output terminals of unit 250, or to trigger the processor 200 to carry out a particular task. It is noted that incidentally, other typical events would be to trigger the sending of control instructions on the SIO, either by: (a) triggering a processor task to load data into the SIO, at which time the data is sent immediately, or (b) triggering a processor task to pre-load data into the SIO, and then another event triggers the SIO to send the data at a specific time critial moment. The timing of the control tasks behind the events in the action event list may be tightly controlled by the timing and control unit 240 in accordance with a delay field in the action event list entries.

According to the embodiments, action event lists like those shown in FIG. 4 may be generated by interpreting event list specification data. This allows for tailoring the radio interface control mechanism to virtually any radio circuit in a flexible manner, simply by downloading appropriate event list specification data.

In an embodiment, the event list specification data may either be loaded into the NVRAM during manufacture, or alternatively, this data would have been held in an application processor's Flash memory and downloaded on power up.

It is noted that radio interface control operations may include operations to configure a baseband data module of the processing unit 100 as well as configuration operations for a synthesizer interface.

Figure 5:
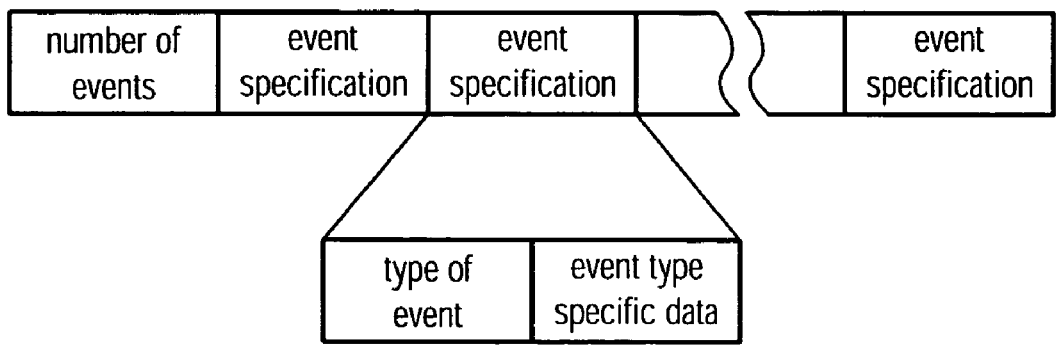
FIG. 5 illustrates an event list specification data structure according to an embodiment.

Turning now to FIG. 5, an event list specification data structure is depicted that may be used to control the generation of action event lists for the radio interface. The event list specification data structure of the embodiment shown in FIG. 5 contains a list of events for a single action event list. The action event lists themselves are generated by a function dedicated to a particular action, such as an action to power up the radio. Each of these functions read the event list specification data allocated to it and produce a corresponding action event list.

By producing event lists in this manner, the sequence and timing of the events for each action can be configured in a file that is downloaded to the processing unit 100. This may significantly de-risk the radio interface.

As shown in the data structure of FIG. 5, a first entry in the specification array may indicate the number of events. Each subsequent element specifies the event to be carried out. The information for each event may identify the type of event and event type specific data.

Examples of event types are hardware signals controlled by the timing and control unit 240, and physical layer platform routines to be run.

The event type specific data section for the event type of hardware signals controlled by the timing and control unit 240 may contain a signal identity and an information whether the signal is to be set or cleared. For the event type of a physical layer platform routine, the event type specific data may contain an identifier indicating which routine is to be run, and a priority level at which the routine is to be run.

Further, the event specification may have a delay field indicating the time when the event is scheduled to occur after the preceding event. For the first event in the list, the time may indicate the delay after the preceding frame interrupt. In other situations, the time of the event may be relative to the time of the required on air data. Thus the delta time may be negative, this being to specify events that must happen before the time of the on air data.

In an embodiment, the event type of physical layer platform routines may make use of data that may be supplied or buffered. In the embodiments, this data is not directly identified in the specification entries, but may be identified at run time by code that loads the data identifier into the pointer array of FIG. 6. The specification elements that specify events that use the identified data may contain a field that identifies the element of the pointer array. This is shown in the "ADS Select" field in FIG. 7.

In a further embodiment, the format of the event list specification data is adapted to be similar to the format of data in the action event lists. This may further simplify the processing of the data.

It is further noted that the event list specification data may be stored in random access memories such as the RAM unit 210 and the NVRAM unit 180. In an embodiment, the event list specification data is loaded into RAM at power on, this being so that it can be used at run time. It can be loaded into the RAM either from the NVRAM 180 or the FLASH 175 (both of which are non-volatile memory devices). That is, when the power is removed, the RAM (being volatile memory) forgets any information that was previously loaded into it. When it powers on again, it always contains gibberish and must have its contents re-loaded.

Other embodiments may use other ways of providing the event list specification to the run time code, e.g. if a Flash device were attached directly to the processing unit, it could be read directly by the run time code.

Even though FIG. 5 shows event specification fields to include event type specific data it is noted that embodiments exist where no event type specific data is included in some or all of the event specification fields.

Figure 6:
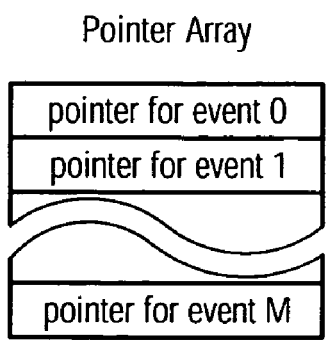
FIG. 6 illustrates a pointer array that may be used in the embodiments.

Referring now to FIG. 6, a pointer array is shown that may be used to identify the data to be used by the tasks specified in the event list specification data. The pointers may be pointers to the data buffers that may be used by some of the tasks triggered by the events. Sometimes these may be replaced with a value that is used as index into a pre-configured table of configuration data.

In the embodiments, whenever event list specification data is to be analyzed, an array of pointers to action data structures is to be set up first. The number of pointers in the array may be fixed for each particular action. In an embodiment, the number of action data structures provided for each event list specification data structure may be predetermined, e.g., hard coded into the software that prepares for the function call.

Similarly, the location in the array of each pointer is fixed. Thus, whilst the order in which each event is specified in the event list specification data may change, each event may be specified to select its own pre-specified element in the array.

It is noted that some of the entries may not be pointers, but may be index words, which identify a fixed value that is held in a table. This table may also be part of the configuration data that is loaded into RAM at power on.

In an embodiment, the event list specification data is analyzed during initialization of the radio communications device. In another embodiment, the event list specification data is analyzed immediately following its download. In a further embodiment, the event list specification data is downloaded and stored, and the data analysis is performed completely independent from the time of download. For instance, the event list specification data analysis may be done at run time, e.g., immediately preceding each action in the radio interface control sequence. In one embodiment, only those lists used at run time are downloaded and stored. In other embodiments, all of the lists are downloaded and stored before they are analysed.

In a further embodiment, individual event list specification data structures may be provided for each radio band. The data structures then include only those events just for those actions which are dependent on the respective band, e.g., the setting of band selection general purpose outputs. Further examples are specification data for a pre-band selection and a post-band selection.

Figure 7:
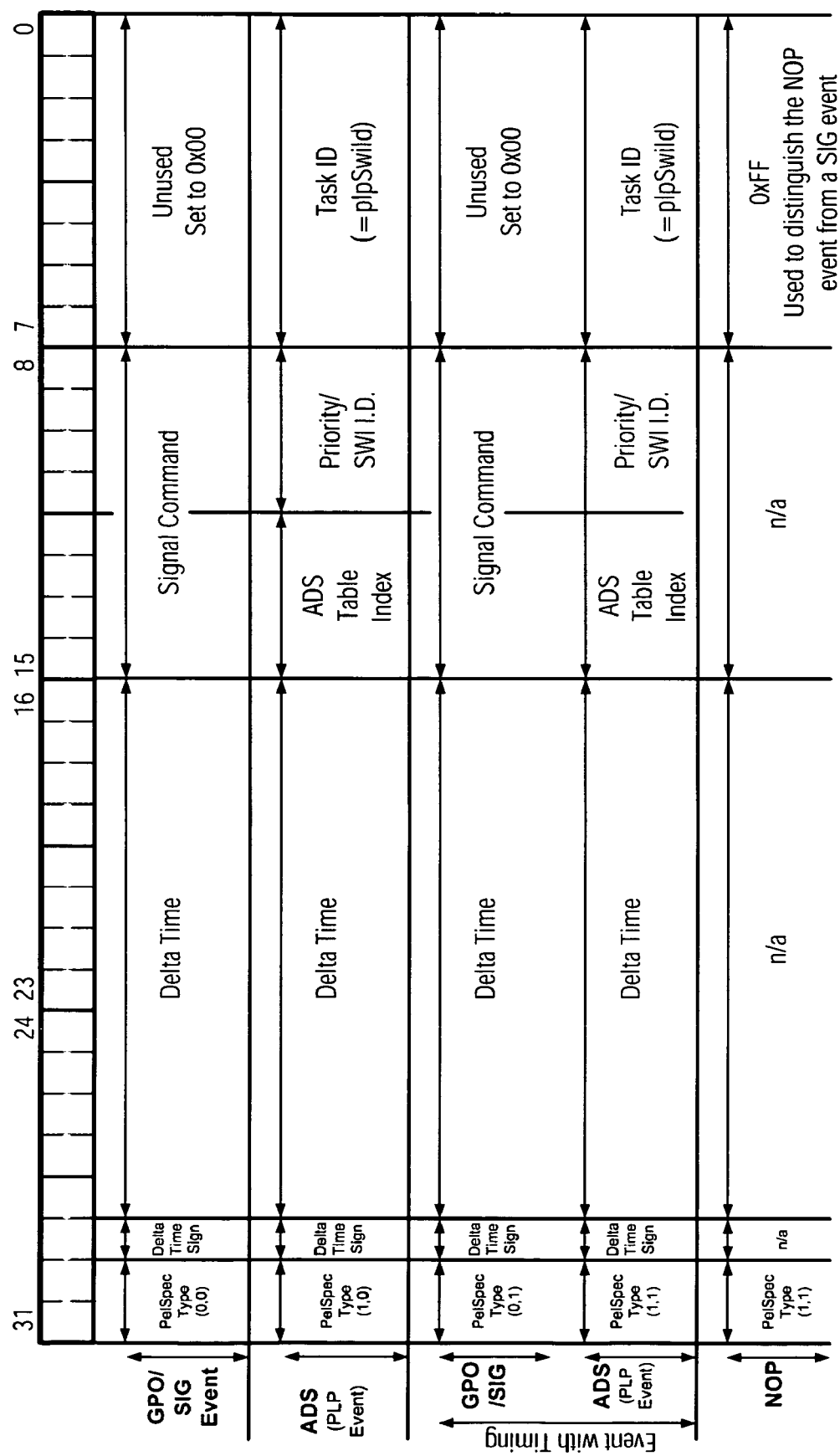
FIG. 7 is a data flow diagram illustrating event list specification data for use in a monitor burst sequence, according to an embodiment, for illustrating the fields of the event list specification data entries.

FIG. 7 gives a further, more detailed example of a format suitable for providing event list specification data. As may be seen, three different event types are shown: a GPO (General Purpose Output) event, an ADS (Action Data Structure) event, and an ADS event with timing. Each event specification starts with an indication of the event type, e.g., the PelSpec (Preordered event list Specification) type. The type definitions are followed by a delta time field that may be used to correctly schedule the respective event. What follows in bits 15 to 0 are event type specific data as discussed above.

Further, a "GPO event with timing" and a No Operation (NOP) event may be present. In addition, embodiments exist where a second word for the "ADS with Timing" eventsis not needed. Furthermore, a means of specifying a negative delta time may be provided.

The "with timing" events may all operate in relation to a single time counter. The first event in a list may have a negative time because the event's time is relative to a fixed event which is synchronized to the GSM network. If the first event has to happen before this "network event", then the delta time may be negative. The NOP event may be particularly useful in adjusting the timing for a sequence of events that is like another sequence but has an event missing.

Figure 8:
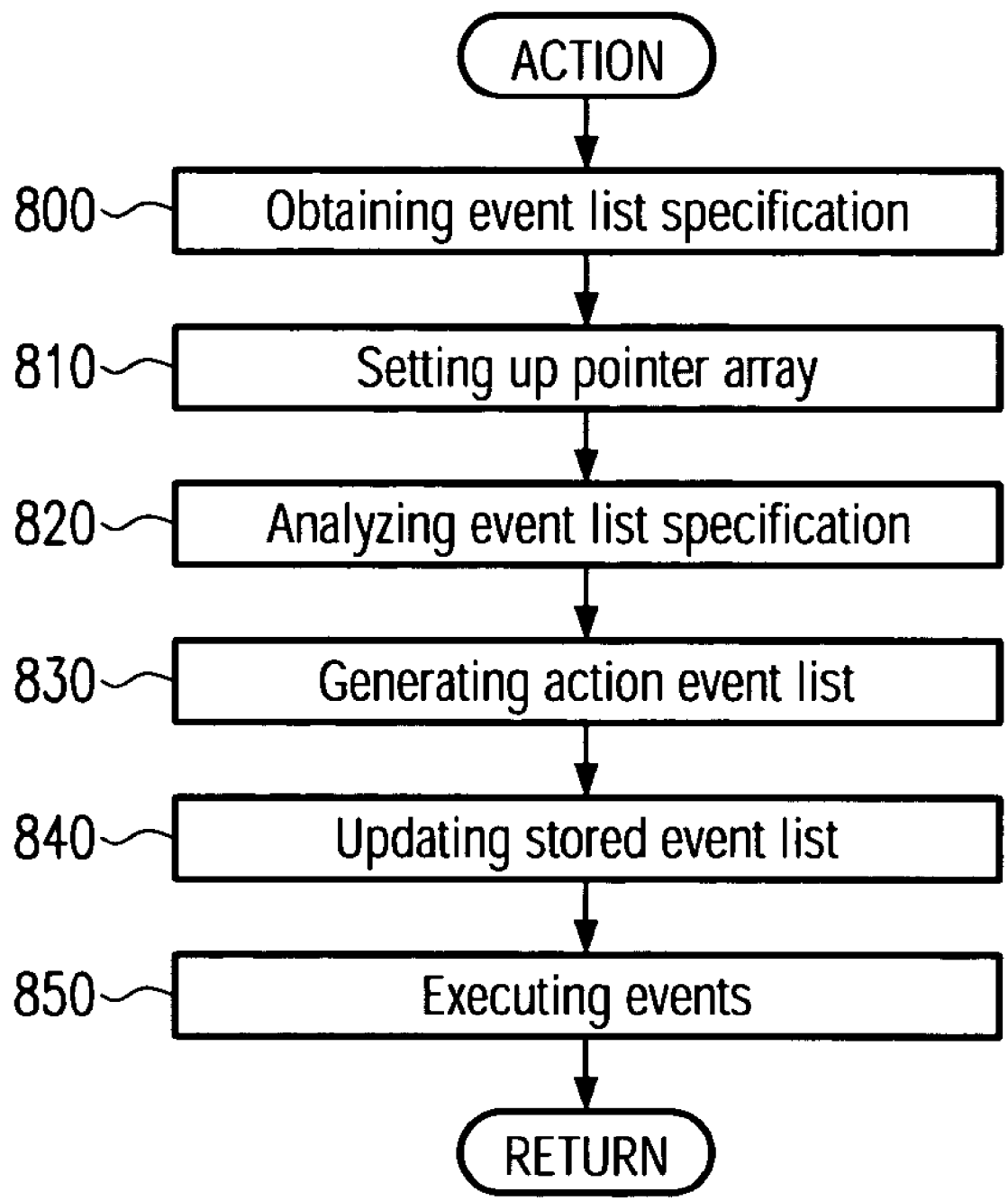
FIG. 8 is a flow chart illustrating a process of performing an action in controlling the radio interface according to an embodiment.

Referring now to FIG. 8, a flow chart is shown illustrating how an action in the radio interface control sequence may be performed. In step 800, an event list specification is obtained, e.g., by downloading a respective data file. Then, the pointer array of FIG. 6 may be set up in step 810. The event list specification is then analyzed in step 820 to generate an action event list in step 830. The generated event list is then stored in a random access memory in step 840, and the events of the list are executed in step 850.

In an embodiment, the event list specification may have been downloaded at power on time as discussed previously. The step 800 may consist of identifying which event list specification to use. This may be done by the use of an index that is hard coded in the "particular action" code. This identifies a pointer to the event list specification to be used for this particular action. There may be more than one event list specification for each particular action, and each event list specification may be used in more than one particular action (for example the lists used to select the radio band).

As mentioned above, the various steps shown in FIG. 8 may be decoupled from each other with respect to the time at which the individual steps are performed. For instance, downloading an event list specification may be necessary only once, and the events of the generated event list may then be executed multiple times without further requiring a download of specification data.

As apparent from the foregoing description of the various embodiments, a technique is described that makes the radio interface highly configurable, thus overcoming the disadvantages of the conventional techniques.

As described above, a control mechanism is provided which may have a software element and a timing and control unit. The timing and control unit may be provided to trigger GPIO outputs, serial transfers, and analysis and control tasks must all within tight real time constraints.

The event list specification may specify these events and their timing. The advantage of the event list specification is that it is easy to change the events specified, along with the order in which they are triggered, and the times at which they are triggered.

As to the radio interface control, this may be organized in the code in a fixed way. That is to say, the order of actions (i.e. control events) and their timing may be dependent on the way that the code is written. It may be necessary to specify the events to suit the particular radio circuit design. These will then have to be adjusted depending on the circuit design/outcome. It may be likely that the order of events and their timing will have to adjusted. It is also fairly likely that some events will have to be deleted, and new ones introduced. In conventional systems, all of these things would have to change if new radio module were to be used.

However, it is messy in conventional systems to change the code as it must be linked into the other (non-changing) software. If the code were to be held in ROM the problem would be seriously compounded. The cost of doing a silicon re-spin is very high, both in time and money. Furthermore the chances are that several re-spins would be necessary. This is not practical. The use of Flash to hold the code would be an improvement, but the use of Flash in the design is expensive compared to be used on-chip ROM.

The use of event list specifications makes it feasible to hold the radio driver code in ROM and to make the final adjustments to the control events by changing some design configuration data (i.e. the event list specifications themselves) which can be loaded into RAM as and when necessary.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A radio communications device comprising:
    a processing unit adapted to perform voice and/or data processing; and
    a radio unit connected to said processing unit to provide received voice and/or data signals to said processing unit,
    wherein said processing unit comprises a radio interface unit interfacing to said radio unit, and a control unit adapted to control operation of said radio unit through said radio interface unit,
    wherein said control unit is adapted to control operation of said radio unit through said radio interface unit based on a list of radio interface control events, said list specifying a sequence of said radio interface control events, each one of said radio interface control events specifying a radio interface control task to be performed in the order of radio interface control events specified by said list when controlling operation of said radio interface unit, and wherein said control unit is adapted to configure said list of radio interface control events based on event list specification data.

2. The radio communications device of claim 1, wherein said control unit is adapted to further control operation of said radio interface unit based on an action list specifying a sequence of actions each having associated an individual one of a plurality of lists of radio interface control events.

3. The radio communications device of claim 2, wherein said action list comprises one or more of the following actions: an action to turn on said radio unit, an action to turn off said radio unit, and an action to capture samples for a monitor slot.

4. The radio communications device of claim 2, wherein said control unit is adapted to run one or more software implemented functions to configure each list of radio interface control events based on said event list specification data.

5. The radio communications device of claim 4, wherein said control unit is adapted to run individual software implemented functions for individual actions.

6. The radio communications device of claim 4, wherein each of said one or more software implemented functions is adapted to set up an array of pointers to an action data structure.

7. The radio communications device of claim 1, wherein said control unit is further adapted to control the timing with which the control tasks are to be performed.

8. The radio communications device of claim 7, wherein said list of radio interface control events comprises delay fields to allow said control unit to control the timing of the control tasks.

9. The radio communications device of claim 1, wherein said control unit is capable of changing the order of events in said list of radio interface control events based on said event list specification data received through said radio unit.

10. The radio communications device of claim 1, wherein said control unit is capable of changing the timing of events in said list of radio interface control events based on said event list specification data received through said radio unit.

11. The radio communications device of claim 1, wherein said control unit is adapted to run one or more software implemented functions to configure said list of radio interface control events based on said event list specification data.

12. The radio communications device of claim 11, wherein said control unit is adapted to run said one or more software implemented functions each time at least one control task of said list of radio interface control events is to be performed.

13. The radio communications device of claim 11, wherein said control unit is adapted to run said one or more software implemented functions at the time of initialization.

14. The radio communications device of claim 1, wherein said control unit is adapted to download said event list specification data at a first time instance, and configure said list of radio interface control events based on the downloaded event list specification data at a second time instance immediately following said first time instance.

15. The radio communications device of claim 1, wherein said control unit is adapted to download said event list specification data at a first time instance, and configure said list of radio interface control events based on the downloaded event list specification data at one or more second time instances when access to said list of radio interface control events is needed.

16. The radio communications device of claim 1, wherein said operation of said radio interface unit controlled by said control unit based on said list of radio interface control events is a baseband data operation.

17. The radio communications device of claim 1, wherein said operation of said radio interface unit controlled by said control unit based on said list of radio interface control events is a synthesizer interface operation.

18. The radio communications device of claim 1, wherein said list of radio interface control events comprises at least one control task to switch a control signal in said control unit.

19. The radio communications device of claim 18, wherein said at least one control task comprises switching a control signal to turn on an oscillator.

20. The radio communications device of claim 18, wherein said at least one control task comprises switching a control signal to enable IQ sample data to be transferred from said radio unit to said processing unit.

21. The radio communications device of claim 18, wherein said at least one control task comprises switching a control signal to change a state of one or more of a plurality of general purpose output terminals.

22. The radio communications device of claim 1, wherein said list of radio interface control events comprises at least one control task to start an analysis routine.

23. The radio communications device of claim 22, wherein said analysis routine is a data analysis routine to determine the received signal strength and set an input amplifier gain in said processing unit.

24. The radio communications device of claim 1, wherein said list of radio interface control events comprises at least one control task to issue a trigger signal to a physical layer platform of said processing unit.

25. The radio communications device of claim 1, wherein said event list specification data is an array of data fields comprising a field specifying a number of events, and a plurality of event specification fields each comprising data specifying an individual event.

26. The radio communications device of claim 1, wherein said event list specification data is an array of data fields comprising event specification fields each comprising a sub field specifying an event type of an individual event.

27. The radio communications device of claim 26, wherein said event type is one of the following: a hardware signal controlled by said control unit, and a software routine capable of being run on a physical layer platform of said processing unit.

28. The radio communications device of claim 27, wherein, if said event type is a hardware signal controlled by said control unit, the respective event specification fields comprise one or more further sub fields specifying a signal identity and/or an indication whether to set or to clear said hardware signal.

29. The radio communications device of claim 27, wherein, if said event type is a software routine capable of being run on a physical layer platform of said processing unit, the respective event specification fields comprise one or more further sub fields specifying said software routine and/or a priority level at which said software routine is to be run and/or a data identifier indexing to a pointer array.

30. The radio communications device of claim 1, wherein said event list specification data is an array of data fields comprising event specification fields each comprising a sub field specifying a positive or negative time distance for an individual event to occur after a preceding event.

31. The radio communications device of claim 1, further comprising a RAM (Random Access Memory) unit configured to store received event list specification data.

32. A radio communications method comprising:
   receiving voice and/or data signals; and
   performing voice and/or data processing,
   wherein said processing comprises controlling operation of a radio unit,
   wherein operation of said radio unit is controlled based on a list of radio interface control events, said list specifying a sequence of said radio interface control events, each one of said radio interface control events specifying a radio interface control task to be performed in the order of radio interface control events specified by the list when controlling operation of a radio unit through a radio interface unit interfacing to said radio unit, and
   wherein said list of radio interface control events is configurable based on event list specification data.

33. The radio communications method of claim 32, wherein operation of said radio interface is controlled based on an action list specifying a sequence of actions each having associated an individual one of a plurality of lists of radio interface control events.

34. The radio communications method of claim 33, wherein said action list comprises one or more of the following actions: an action to turn on a radio circuit, an action to turn off a radio circuit, and an action to capture samples for a monitor slot.

35. The radio communications method of claim 33, further comprising:
   running one or more software implemented functions to configure each list of radio interface control events based on said event list specification data.

36. The radio communications method of claim 35, further comprising:
   running individual software implemented functions for individual actions.

37. The radio communications method of claim 35, wherein each of said one or more software implemented functions is adapted to set up an array of pointers to an action data structure.

38. The radio communications method of claim 32, further comprising:
   controlling the timing with which the control tasks are to be performed.

39. The radio communications method of claim 38, wherein said list of radio interface control events comprises delay fields to control the timing of the control tasks.

40. The radio communications method of claim 32, further comprising:
   changing the order of events in said list of radio interface control events based on said received event list specification data.

41. The radio communications method of claim 32, further comprising:
   changing the timing of events in said list of radio interface control events based on said received event list specification data.

42. The radio communications method of claim 32, further comprising:
   running one or more software implemented functions to configure said list of radio interface control events based on said event list specification data.

43. The radio communications method of claim 42, further comprising:
   running said one or more software implemented functions each time at least one control task of said list of radio interface control events is to be performed.

44. The radio communications method of claim 42, further comprising:
   running said one or more software implemented functions at the time of initialization.

45. The radio communications method of claim 32, further comprising:
   downloading said event list specification data from a remote data store at a first time instance; and
   configuring said list of radio interface control events based on the downloaded event list specification data at a second time instance immediately following said first time instance.

46. The radio communications method of claim 32, further comprising:
   downloading said event list specification data from a remote data store at a first time instance; and
   configuring said list of radio interface control events based on the downloaded event list specification data at one or more second time instances when access to said list of radio interface control events is needed.

47. The radio communications method of claim 32, wherein said operation of said radio interface controlled based on said list of radio interface control events is a baseband data operation.

48. The radio communications method of claim 32, wherein said operation of said radio interface controlled based on said list of radio interface control events is a synthesizer interface operation.

49. The radio communications method of claim 32, wherein said list of radio interface control events comprises at least one control task to switch a control Signal.

50. The radio communications method of claim 49, wherein said at least one control task comprises switching a control signal to turn on an oscillator.

51. The radio communications method of claim 49, wherein said at least one control task comprises switching a control signal to enable IQ sample data to be received.

52. The radio communications method of claim 49, wherein said at least one control task comprises switching a control signal to change a state of one or more of a plurality of general purpose output terminals.

53. The radio communications method of claim 32, wherein said list of radio interface control events comprises at least one control task to start an analysis routine.

54. The radio communications method of claim 53, wherein said analysis routine is a data analysis routine to determine the received signal strength and set an input amplifier gain.

55. The radio communications method of claim 32, wherein said list of radio interface control events comprises at least one control task to issue a trigger signal to a physical layer platform.

56. The radio communications method of claim 32, wherein said event list specification data is an array of data fields comprising a field specifying a number of events, and a plurality of event specification fields each comprising data specifying an individual event.

57. The radio communications method of claim 32, wherein said event list specification data is an array of data fields comprising event specification fields each comprising a sub field specifying an event type of an individual event.

58. The radio communications method of claim 57, wherein said event type is one of the following: a hardware signal to be controlled, and a software routine capable of being run on a physical layer platform.

59. The radio communications method of claim 58, wherein, if said event type is a hardware signal to be controlled, the respective event specification fields comprise one or more further sub fields specifying a signal identity and/or an indication whether to set or to clear said hardware signal.

60. The radio communications method of claim 58, wherein, if said event type is a software routine capable of being run on a physical layer platform of said processing unit, the respective event specification fields comprise one or more further sub fields specifying said software routine and/or a priority level at which said software routine is to be run and/or a data identifier indexing to a pointer array.

61. The radio communications method of claim 32, wherein said event list specification data is an array of data fields comprising event specification fields each comprising a sub field specifying a positive or negative time distance for an individual event to occur after a preceding event.

62. The radio communications method of claim 32, further comprising:
storing received event list specification data in a RAM (Random Access Memory) unit.

63. A radio communications method comprising:
receiving event list specification data from a remote data store;
analyzing the received event list specification data;
generating a list of radio interface control events from the analyzed event list specification data, said list specifying a sequence of said radio interface control events, each one of said radio interface control events specifying a radio interface control task to be performed in the order of radio interface control events specified by said list when controlling operations of a radio unit through a radio interface unit interfacing with said radio unit;
storing the generated list of radio interface control events; and
controlling operation of said radio unit through said radio interface unit by executing events in the stored list of radio interface control events.

64. A computer-readable storage medium storing instructions that, when executed on a processor of a computer, cause said processor to generate an event list specification data structure arranged for being transmitted to a radio communications device that is capable of generating a list of radio interface control events therefrom, said list specifying a sequence of said radio interface control events, each of said radio interface control events specifying a radio interface control task to be performed in the order of radio interface control events specified by said list when controlling operation of a radio unit through a radio interface unit interfacing to said radio unit, and controlling operation of said radio unit through said radio interface unit by executing events in the generated list of radio interface control events.

65. A computer-readable storage medium storing an event list specification data structure allowing a radio communications device to generate a list of radio interface control events therefrom and control operation of a radio unit through a radio interface interfacing with a radio unit by executing events in the generated list of radio interface control events, said list specifying a sequence of said radio interface control events, wherein each of said radio interface control events specifies a radio interface control task to be performed in the order of radio interface control events specified by said list when controlling operation of said radio unit through said radio interface.

66. A computer-readable storage medium storing instructions that, when executed on a processor of a radio communications device, cause said processor to obtain an event list specification data structure and generate a list of radio interface control events therefrom for controlling operation of a radio unit through a radio interface interfacing to said radio unit by executing events in the generated list of radio interface control events, said list specifying a sequence of said radio interface control events, wherein each of said radio interface control events specifies a radio interface control task to be performed in the order of radio interface control events specified by said list when controlling operation of said radio unit through said radio interface.

* * * * *

UNITED STATES PATENT AND TRADEMARK OFFICE
CERTIFICATE OF CORRECTION

PATENT NO. : 7,636,555 B2  Page 1 of 1
APPLICATION NO. : 11/106774
DATED : December 22, 2009
INVENTOR(S) : Derek Golightly It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Ninth Day of November, 2010

David J. Kappos
*Director of the United States Patent and Trademark Office*